United States Patent [19]

Revis

[11] Patent Number: 4,954,401
[45] Date of Patent: Sep. 4, 1990

[54] PROCESS OF CURING METHYLHYDROSILOXANES

[75] Inventor: Anthony Revis, Saginaw County, Mich.

[73] Assignee: Dow Corning Corporation, Midland, Mich.

[21] Appl. No.: 392,320

[22] Filed: Aug. 11, 1989

[51] Int. Cl.$^5$ .............................................. B32B 27/36
[52] U.S. Cl. ...................................... 428/412; 528/15; 528/26; 528/31; 428/447; 428/449; 428/450; 427/387; 427/388.1; 427/393.5; 427/395
[58] Field of Search .......................... 528/15, 26, 31; 428/412, 447, 449, 450; 427/387, 388.1, 393.5, 395

[56] References Cited

U.S. PATENT DOCUMENTS

| | | | |
|---|---|---|---|
| 2,970,150 | 1/1961 | Bailey | 528/28 |
| 4,476,166 | 10/1984 | Eckberg | 528/15 |
| 4,558,111 | 12/1985 | Tolentino | 528/26 |
| 4,680,365 | 7/1987 | Müller et al. | 528/31 |

Primary Examiner—Melvyn I. Marquis
Assistant Examiner—Karen A. Hellender
Attorney, Agent, or Firm—Jim L. DeCesare

[57] ABSTRACT

A process of curing and cross-linking methylhydrosiloxanes by contacting and forming a mixture of an allyl ester with at least one methylhydrosiloxane in the presence of a Group VIII metal catalyst, and heating the mixture of the allyl ester, the methylhydrosiloxane, and the Group VIII metal catalyst, in the presence of ambient moisture until the methylhydrosiloxane becomes cured and cross-linked.

18 Claims, No Drawings

PROCESS OF CURING METHYLHYDROSILOXANES

BACKGROUND OF THE INVENTION

This invention relates to a method of curing and cross-linking methylhydrosiloxanes, and includes compositions and mixtures of methylhydrosiloxanes prepared in accordance with the method.

The cross-linking of silicones to form higher molecular weight polymers has been used to prepare many useful silicone products. One example is the hydroylsis of reactive chloro, alkoxy, and amino, silanes to form various fluids, resins, and elastomers through silanol condensation. Low molecular weight resinous silicones have been formulated with high viscosity silanol fluids to prepare pressure sensitive adhesives. These pressure sensitive adhesives have medical utility such as surgical dressings as well as various non-medical applications. The cross-linking reaction of vinyl endblocked silicone fluids of about one thousand centistoke viscosity with methyl/hydrogen silicones in the presence of a platinum catalyst provides "psuedo" interpenetrating network gels. These gels are used in applications ranging from breast implants to paper coatings. Condensation curing has been employed to prepare room temperature vulcanizing sealants and adhesives. The room temperature vulcanizing and curable silicones have been composed of cross-linkers with moisture sensitive groups on silicon, and are typically catalyzed by tin, zinc, titanium, iron, or carboxylate salt catalysts. High temperature vulcanizing cures involve a method in which a peroxide initiates a cure of a silicon hydride and an olefin substituted silicone at elevated temperature. Such technology has found application in penile prosthesis, for example.

U.S. Pat. No. 4,746,750, issued May 24, 1988, relates to the hydrosilylation of allyl methacrylate with trimethylsilane in the presence of a rhodium catalyst to provide bis(trimethylsilyl)dimethylketene acetal. The mechanism of the reaction involves the intermediate formation of trimethylsilyl methacrylate which undergoes further hydrosilylation by trimethysilane. This was indicated to occur as a result of the addition of the silane to the olefin to provide an adduct which suffered facile beta elimination of propene. However, the trimethylsilyl methacrylate was not isolated. Thus, the mechanism according to the '750 patent can be illustrated as follows:

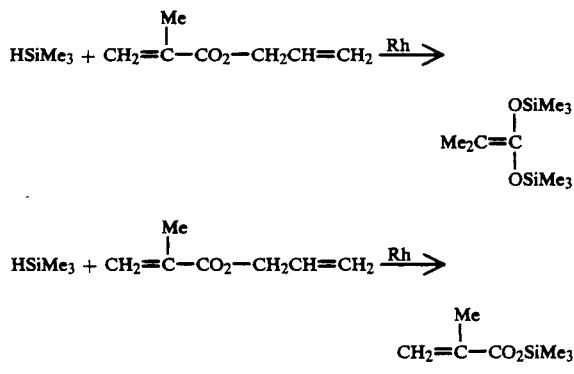

Evidence of the intermediacy of trimethylsilyl methacrylate has been obtained by the reaction of other allyl esters with various silanes, for example, the reaction of trimethylsilane with allyl acetate and allyl butyrate. The reaction has also been carried out with silanes such as phenyldimethylsilane and dimethylchlorosilane which produce equivalent results. For example, sym-tertramethyldisiloxane provides the corresponding di-ester disiloxane shown below. This synthetic method is the subject of my prior copending U.S. Pat. application Ser. No. 351,639, filed May 15, 1989. In accordance with my copending application, the mechanism can be illustrated as follows:

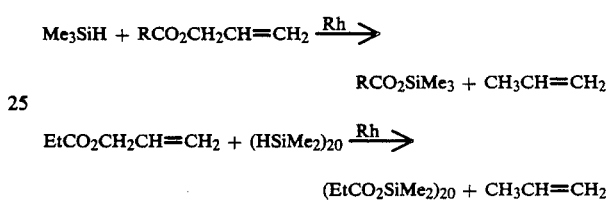

in which R is methyl or ethyl, and Me and Et are methyl and ethyl, respectively.

The mechanism is believed to involve the hydrosilylative addition of the silane either to the internal olefin or to the carbonyl followed by elimination of propene, however, the mechanism for silyl ester formation has not been completely delineated. These reactions do, however, clearly demonstrate a novel method of exchanging the allyl group of an allyl ester for a silyl group of a silicon hydride.

Since one of the major cure reactions used in sealants is acetoxy hydroylsis known as moisture curing, it has been unexpectedly discovered that the foregoing technology for converting a silicon hydride to a silicon ester could be applied in a new and novel manner for creating an "in situ" acetoxy cure. Thus, and in accordance with the concept of the present invention, the silicon hydrogens on a silicone are converted to acetoxy groups and exposed to air, and the material cures and cross-links through silanols to form ne siloxane bonds.

SUMMARY OF THE INVENTION

This invention relates to a process of curing and cross-linking methylhydrosiloxanes by contacting and forming a mixture of an allyl ester with at least one methylhydrosiloxane in the presence of a Group VIII metal catalyst, and heating the mixture of the allyl ester, the methylhydrosiloxane, and the Group VIII metal catalyst, in the presence of ambient moisture until the methylhydrosiloxane becomes cured and cross-linked.

In the process, the mixture of the allyl ester, the methylhydrosiloxane, and the Group VIII metal catalyst, is heated at a temperature in excess of about one hundred twenty-five degrees Centigrade. There may also be included in the mixture at least two methylhydrosiloxanes. In addition, the mixture may include at least one chemically inert polyorganosiloxane in addition to the methylhydrosiloxane.

The invention is also directed to a methylhydrosiloxane cured and cross-linked in accordance with the method as described above, and wherein the cured and cross-linked methylhydrosiloxane is formed into the shape of a film. The methylhydrosiloxane film may be coated on the surface of a substrate such as aluminum, paper, polyesters, polycarbonates, and acrylics.

The invention further relates to a mixture of at least one chemically inert polyorganosiloxane and a cured and cross-linked methylhydrosiloxane prepared in accordance with the above described method and wherein the chemically inert polyorganosiloxane is entrapped by the cured and cross-linked methylhydrosiloxane. A methylhydrosiloxane cured and cross-linked in accordance with this method is also disclosed and wherein the cured and cross-linked methylhydrosiloxane is prepared in bulk. For purposes of the present invention, "bulk" is defined as curing in a container to a depth in excess of about one-eighth of an inch. Cured and cross-linked mixtures of at least two methylhydrosiloxanes are further described herein.

These and other features, objects, and advantages, of the herein described invention will become more apparent when considered in light of the accompanying detailed description thereof.

DETAILED DESCRIPTION OF THE INVENTION

As noted hereinabove, the present invention concerns a process of curing and cross-linking methylhydrosiloxanes by contacting and forming a mixture of an allyl ester with at least one methylhydrosiloxane in the presence of a Group VIII metal catalyst, and heating the mixture of the allyl ester, the methylhydrosiloxane, and the Group VIII metal catalyst, in the presence of ambient moisture until the methylhydrosiloxane becomes cured and cross-linked.

The allyl ester employed in the process can be allyl butyrate, allyl acetate, allyl methacrylate, vinyl acetate, allyl acrylate, vinyl butyrate, and other known allyl esters. For purposes of the present invention, the siloxanes which may be used are methylhydrosiloxanes among which are bis(trimethylsiloxy)dimethyldisiloxane, bis(trimethylsiloxy)methylsilane, diphenyldimethyldisiloxane, diphenyltetrakis(dimethylsiloxy)disiloxane, heptamethyltrisiloxane, hexamethyltrisiloxane, methylhydrocyclosiloxanes, methyltris(dimethylsiloxy)silane, octamethyltetrasiloxane, pentamethylcyclopentasiloxane, pentamethyldisiloxane, phenyltris(dimethylsiloxy)silane, polymethylhydrosiloxane, tetrakis(dimethylsiloxy)silane, tetramethylcyclotetrasiloxane, tetramethyldisiloxane, and methylhydrodimethylsiloxane copolymers.

The preferred Group VIII metal catalyst is $RhCl_3$, although other appropriate catalyst systems may be employed such as $ClRh(PPh_3)_3$; $H_2PtCl_6$; a complex of 1,3-divinyl tetramethyl disiloxane and $H_2PtCl_6$; and alkyne complexes of $H_2PtCl_6$. A more exhaustive list of appropriate catalyst systems is set forth in the '750 patent, which is considered incorporated herein by reference. The most effective concentration of the Group VIII metal catalyst has been found to be from about ten parts per million to about two thousand parts per million on a molar basis relative to the allyl ester.

As used herein, the term chemically inert polyorganosiloxane is intended to denote a polymer of the formula

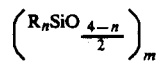

wherein n is an integer between zero and three, and m is two or more. The simplest silicone materials are the polydimethylsiloxanes. Polydimethylsiloxanes have the structure

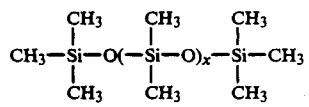

where x is an integer of from one to about one hundred thousand. The repeating unit of the polymer

is the dimethylsiloxane unit. The terminal unit (Me3SiO) is the trimethylsiloxy group. At low molecular weights, silicones are fluids, and at high molecular weights, they are gums which may be cross-linked to form elastomeric products. The methyl group in a silicone may be substituted by a variety of other substituents including for example, phenyl, or ethyl. Conventional silicones are the trimethylsiloxy terminated polydimethylsiloxanes. Such materials are available in viscosities ranging from 0.65 to 2,500,000 centistokes. Substituents on the silicon consist of methyl groups. Termination of the polymer chain prevents viscosity change and other alterations of the physical properties of the silicone polymeric materials. The polydimethylsiloxanes exhibit characteristic properties of low viscosity change with temperature; thermal stability; oxidative stability; chemical inertness; non-flammability; low surface tension; high compressibility; shear stability; and dielectric stability.

The polydimethylsiloxane fluid used herein as the chemically inert polyorganosiloxane is a high molecular weight polymer having a molecular weight in the range from about 200 to about 200,000, and has a viscosity in the range from about 20 to 2,000,000 centistokes, preferably from about 500 to 50,000 centistokes, more preferably about 50 centistokes at 25 degrees Centigrade. The siloxane polymer is generally end-blocked with trimethylsilyl groups but other end blocking groups are also suitable. The polymer can be prepared by various techniques such as the hydrolysis and subsequent condensation of dimethyldihalosilanes, or by the cracking and subsequent condensation of dimethylcyclosiloxanes.

For purposes of the present invention, the term "skinned over" is defined as curing to a solid film on top of a fluid that can be touched and which does not leave a visibly wet residue, which is not tacky, but which is not fully cured. "Cured" is defined as the formation of a solid film that does not leave a visibly wet residue when touched. "Cheesy") is defined as a cured solid that when rubbed has the texture of cheese. "Tacky" is defined as cured to a gelatinous texture that adheres to the fingers when touched. "Orange peel" is defined as cured to a clear undulant appearance. "Spongy" is defined as cured to a porous solid.

Following are several examples illustrating the process of the present invention as well as the various products produced in accordance with the present invention. For the sake of simplicity, tetrahydrofuran has been referred to as THF.

EXAMPLE I

A catalyst was prepared by stirring 10 gm of $RhCl_3 3H_2O$ in 1200 gm of THF at room temperature for 12 hours. This catalyst was employed in the examples unless otherwise specified. A solution of 20 g of polymethylhydrosiloxane having a viscosity of about thirty centistokes, hereinafter referred to as PMHS, 2 g of allyl acetate, and 0.2 g catalyst was prepared, and about 30 drops of this cloudy, yellow fluid was used to coat the bottom of a 2 inch aluminum weighing pan. The pan was immediately placed in a 125 degrees Centigrade oven for 5 minutes. Upon removal, the material had cured to a smooth, clear, and colorless film.

EXAMPLE II

A mixture of 2.0 g of PMHS, 3.5 g of allyl acetate, and 0.02 g of catalyst were combined. The material was coated in a 2 inch aluminum weighing pan and placed in a 125 degrees Centigrade oven for 5 minutes. The material cured and was very brittle.

EXAMPLE III

A solution of 3.0 g of PMHS and 5 drops of catalyst was poured in a 2 inch aluminum weighing pan. The solution was liquid after 10 minutes, and was tacky after 20 minutes, and had skinned over to a tack free film within 40 minutes.

EXAMPLE IV

A mixture of 2.0 g $Me_3SiO(SiMe_2O)_{54}(SiMeHO)_6SiMe_3$, 0.3 g allyl acetate, and 0.02 g catalyst were combined. The mixture was used to coat the bottom of a 2 inch aluminum weighing pan. The pan was placed in an oven at 175 degrees Centigrade over and provided a cured coating after 5 minutes which had a cheesy texture and an orange peel appearance. A 12 minute cure at this temperature yielded the same results.

EXAMPLE V

A mixture of 2.0 g of $Me_3SiO(SiMe_2O)_{27}(SiMeHO)_3SiMe_3$, 0.3 g of allyl acetate, and 0.02 g of catalyst were combined and used to coat a 2 inch aluminum weighing pan. The pan was placed in a 175 degrees Centigrade oven for 10 minutes after which time the material had cured to a cheesy coating with an orange peel appearance.

EXAMPLE VI

A mixture of 2 g of $Me_3SiO(SiMe_2O)_{97}(SiMeHO)_2 2SiMe_3$, 0.39 g of allyl acetate, and 2 drops catalyst were combined. The formulation was coated in a 2 inch aluminum weighing pan and cured to a smooth appearance which had a cheesy texture at 125 degrees Centigrade for 10 minutes.

EXAMPLE VII

A mixture of 2 g of $Me_3SiO(SiMe_2O)_{86}(SiMeHO)_2 2SiMe_3$, 0.62 g of allyl acetate, and 3 drops of catalyst were combined. A portion of the formulation was coated on a 2 inch aluminum weighing pan and heated at 125 degrees Centigrade for 10 minutes. This cured to a smooth appearance resulting in a cheesy textured coating.

EXAMPLE VIII

A solution of 3.0 g of $Si(OSiMe_2H)_4$, 0.6 g of allyl acetate and 0.3 g of catalyst was prepared in a glass vial. This solution is hereinafter referred to as "Stock A". To 0.15 g of Stock A was added 0.75 gm of $HSiMe_2O(SiMe_2O)_{13}SiMe_2H$. The resulting formulation was poured into a 2 inch aluminum weighing pan and placed in an over at 126 degrees Centigrade. The material skinned over in 10 min and was fully cured in 60 min providing an undulant film.

EXAMPLE IX

To 0.15 g of the Stock A was added 0.75 gm of $Me_3SiO(SiMe_2O)_{70}(SiMeHO)_3SiMe_3$. The resulting formulation was poured into a 2 inch aluminum weighing pan and placed in an over at 126 degrees Centigrade. The material was tacky after 60 minutes.

EXAMPLE X

To 0.15 g of Stock A was added 0.75 g of $Me_3SiO(SiMe_2O)_{100}(SiMeHO)_9SiMe_3$. The resulting formulation was poured into a 2 inch aluminum weighing pan and placed in an over at 126 degrees Centigrade. The material skinned over in 10 minutes and was fully cured in 60 minutes providing a smooth film.

EXAMPLE XI

A solution of 9.7 g of $Me_3SiO(SiMe_2O)_{100}(SiMeHO)_9SiMe_3$, 0.3 g of PMHS and 0.3 g of allyl acetate was prepared. This solution is hereinafter referred to as "Stock B". To 1.0 g of Stock B was added 0.2 g of allyl acetate and 0.4 g of PMHS. After 15 minutes a soft, tacky, and cheesy film formed.

EXAMPLE XII

A portion of the solution from Example I was applied to super calendared Kraft paper with a No. 8 wire wound rod and cured in an oven at 125 degrees Centigrade for 5 minutes. This provided a cured coating of a thickness of about 0.6 lbs/ream which showed good adhesive release.

EXAMPLE XIII

A portion of the solution from Example VII was applied to super calendared Kraft paper with a No.8 wire wound rod and provided a smooth cured coating when cured for 10 minutes at 175 degrees Centigrade.

EXAMPLE XIV

A portion of the solution from Example I was applied to MYLAR polyethylene terephthalate with a No. 8 wire wound rod and cured in an oven at 125 degrees Centigrade for 5 minutes. This provided a cured coating which showed good adhesive release. This procedure was followed with the coatings from Examples VI and VII. Both provided smooth films on MYLAR when cured for ten minutes but the coating from Example VII was heated in the oven to 175 degrees Centigrade instead of 125 degrees Centigrade.

EXAMPLE XV

A portion the solution from Example I was applied to an isopropanol cleaned Lexan polycarbonate plate which was placed in a 125 degrees Centigrade oven for 10 minutes. Upon removal, the plate cured to a smooth film.

EXAMPLE XVI

A portion of the solution from Example I was applied to an isopropanol cleaned Plexiglass G acrylic plate and allowed to remain in a 125 degrees Centigrade oven for 10 minutes at which time curing occurred, although a slight warping of the acrylic plate was apparent.

EXAMPLE XVII

In this example and Examples XVIII and XIX, a full medicine dropper containing about 0.65 g is used as the unit of measurement. The medicine dropper employed was a 2 ml three inch Fisher brand eyedropper with a tapered black rubber bulb. The procedure used was to prepare the formulation and to transfer the formulation with the eyedropper to either a 5 dram or 2 dram vial which was heated in an oven. Thus, a mixture of 20 g PMHS, 2 g allyl acetate, and 0.2 g catalyst were combined. A total of 2 eyedroppers full cured at 125 degrees Centigrade for 60 minutes to form a spongy clear material having a little residual liquid. This same amount cured at 175 degrees Centigrade without residual liquid. A half full 5 dram vial at 175 degrees Centigrade cured clear and spongy and was jellatinous on the bottom of the vial. A full 2 dram vial also cured and was spongy, slightly tacky, and somewhat jellatinous. All times unless otherwise specified were 60 minutes.

EXAMPLE XVIII

A mixture of 10 g of PMHS, 17.5 g allyl acetate, and 0.1 g of catalyst were combined. A total of 2 eyedroppers resulted in a spongy brittle cavitated foam upon curing at 175 degrees Centigrade for 60 minutes. A total of 3 eyedroppers resulted in a spongy brittle and cavitated foam at 175 degrees Centigrade. A half full 5 dram vial foamed out of the vial and cured at 175 degrees Centigrade. A half full 5 dram vial at 125 degrees Centigrade provided the same results. All times were 60 minutes unless otherwise specified.

EXAMPLE XIX

A total of 2 medicine droppers full of the mixture from Example VI was transferred to a 5 dram vial. When heated at 175 degrees Centigrade for 60 minutes the material cross-linked to a tacky fluid. A mixture of 2 medicine droppers full of the mixture from Example VII was transferred to a 2 dram vial. Heating at 175 degrees Centigrade for 60 minutes resulted in the material cross-linking to form a nontacky gel.

EXAMPLE XX

A mixture of 19.6 g of PMHS, 0.4 g of polydimethylsiloxane having a viscosity of about fifty centistokes at twenty-five degrees Centigrade, 2.0 g of allyl acetate, and 0.2 g of catalyst was prepared and thermally cured in an aluminum weighing pan at 175 degrees Centigrade for 10 minutes. The cured coating contained cracks and was flexible.

EXAMPLE XXI

A mixture of 1 g of $Me_3SiO(Me_2SiO)_{97}(MeSiHO)_{1.1}SiMe_3$, 1 g of polydimethylsiloxane having a viscosity of about fifty centistokes, 0.39 g of allyl acetate, and 2 drops of catalyst was prepared. Curing in a 2 inch aluminum weighing pan resulted in a cheesy nontacky coating at 175 degrees Centigrade for 15 minutes.

EXAMPLE XXII

A mixture of 1 g of $Me_3SiO(Me_2SiO)_{97}(MeSiHO)_{1.1}SiMe_3$, 0.5 g of fifty centistoke polydimethylsiloxane, 0.195 g allyl acetate, and 2 drops catalyst was prepared. Curing in an aluminum weighing pan at 175 degrees Centigrade for 15 minutes resulted in a slightly tacky material which contained a liquid residue.

EXAMPLE XXIII

A mixture of 1 g of $Me_3SiO(Me_2SiO)_{97}(MeSiHO)_{1.1}SiMe_3$, 0.3 g of polydimethylsiloxane of fifty centistoke viscosity, 0.195 g of allyl acetate, and 2 drops catalyst was prepared and cured in a 2 inch aluminum weighing pan resulting in a slightly tacky material.

EXAMPLE XXIV

In the following examples, the catalyst employed was a 0.1 N solution of $H_2PtCl_6$ in isopropanol. Accordingly, a mixture of 1.0 g of PMHS, 0.10 g of allyl acetate and 0.01 g of catalyst was prepared. A total of 10 drops of each the formulation was coated in an aluminum weighing pan. The formulation cured at 5 minutes at 125 degrees Centigrade, and in repetitive examples with 30 drops of the platinum formulation, curing occured between 5 seconds and 10 seconds at 125 degrees Centigrade. The films formed with platinum were hard, very brittle, and contained cavities.

EXAMPLE XXV

A mixture of 1.0 g of PMHS and 0.01 g of catalyst was prepared. A total of 30 drops of formulation was coated in an aluminum weighing pan. At the conclusion of 5 minutes at 125 degrees Centigrade, the sample cured to a cracked material which easily flaked.

EXAMPLE XXVI

Aluminum weighing pans were each coated with 10 drops and 30 drops respectively, of PMHS and placed in an oven at 125 degrees Centigrade. Within 20 minutes a tacky filmed formed. The PMHS formed a tack free film in thirty minutes.

EXAMPLE XXVII

A mixture of 10 g of PMHS, 1.0 g of allyl acetate and 0.1 g of the platinum catalyst was prepared in a 5 dram vial and placed in an oven at 125 degrees Centigrade. At the end of one hour the material cured. The cured formulation bubbled out of the vial, was hard, contained cavities, and was very brittle.

It will be apparent from the foregoing that many other variations and modifications may be made in the compounds, compositions, and methods described herein without departing substantially from the essential features and concepts of the present invention. Accordingly, it should be clearly understood that the forms of the invention described herein are exemplary only and are not intended as limitations on the scope of the present invention.

That which is claimed is:

1. A process of curing and cross-linking methylhydrosiloxanes comprising contacting and forming a mixture of an allyl ester with at least one methylhydrosiloxane in the presence of a Group VIII metal catalyst, and heating the mixture of the allyl ester, the methylhydrosiloxane, and the Group VIII metal catalyst, in the presence of ambient moisture until the methylhydrosiloxane becomes cured and cross-linked.

2. The process according to claim 1 wherein the mixture of the allyl ester, the methylhydrosiloxane, and the Group VIII metal catalyst, is heated at a temperature in excess of about one hundred twenty-five degrees Centigrade.

3. The process according to claim 2 wherein there is included in the mixture at least two methylhydrosiloxanes.

4. The process according to claim 2 wherein there is included in the mixture at least one chemically inert polyorganosiloxane in addition to the methylhydrosiloxane, and the methylhydrosiloxane is cured and cross-linked entrapping the chemically inert polyorganosiloxane.

5. The process according to claim 4 wherein the chemically inert polyorganosiloxane is polydimethylsiloxane having a viscosity of about fifty centistokes measured at twenty-five degrees Centigrade.

6. The process according to claim 1 wherein the allyl ester is selected from the group consisting of allyl butyrate, allyl acetate, allyl methacrylate, vinyl acetate, allyl acrylate, and vinyl butyrate.

7. The process according to claim 6 wherein the methylhydrosiloxane is selected from the group consisting of bis(trimethylsiloxy)dimethyldisiloxane, bis(trimethylsiloxy)methylsilane, diphenyldimethyldisiloxane, diphenyltetrakis(dimethylsiloxy)disiloxane, heptamethyltrisiloxane, hexamethyltrisiloxane, methylhydrocyclosiloxanes, methyltris,(dimethylsiloxy)silane, octamethyltetrasiloxane, pentamethylcyclopentasiloxane, pentamethyldisiloxane, phenyltris(dimethylsiloxy)silane, polymethylhydrosiloxane, tetrakis(dimethylsiloxy)silane, tetramethylcyclotetrasiloxane, tetramethyldisiloxane, and methylhydrodimethylsiloxane copolymers.

8. The process according to claim 6 wherein the Group VIII metal catalyst is $RhCl_3$.

9. The process according to claim 6 wherein the Group VIII metal catalyst is selected from the group consisting of $ClRh(PPh_3)_3$, $H_2PtCl_6$, a complex of 1,3-divinyl tetramethyl disiloxane and $H_2PtCl_6$, and alkyne complexes of $H_2PtCl_6$.

10. The process according to claim 6 wherein the concentration of the Group VIII metal catalyst is from about ten parts per million to about two thousand parts per million on a molar basis relative to the allyl ester.

11. A mixture of at least one chemically inert polyorganosiloxane and a cured and cross-linked methylhydrosiloxane prepared in accordance with claim 4, and wherein the chemically inert polyorganosiloxane is entrapped by the cured and cross linked methylhydrosiloxane.

12. A methylhydrosiloxane cured and cross-linked in accordance with the process of claim 1, and wherein the cured and cross-linked methylhydrosiloxane is prepared in bulk.

13. The process according to claim 1 including the step of forming the mixture into the shape of a thin film prior to heating of the mixture of the allyl ester, the methylhydrosiloxane, and the Group VIII metal catalyst.

14. The process according to claim 1 including the step of forming the mixture in bulk prior to heating of the mixture of the allyl ester, the methylhydrosiloxane, and the Group VIII metal catalyst.

15. The process according to claim 1 wherein the mixture is heated in the presence of air.

16. A cured and cross-linked mixture of at least two methylhydrosiloxanes prepared in accordance with the process of claim 3.

17. Film prepared by a process comprising contacting and forming a mixture of an allyl ester with at least one methylhydrosiloxane in the presence of a Group VIII metal catalyst, forming the mixture into the shape of a film, and heating the mixture of the allyl ester, the methylhydrosiloxane, and the Group VIII metal catalyst, in the presence of ambient moisture until the methylhydrosiloxane becomes cured and cross-linked.

18. The film according to claim 17 wherein the film is coated on the surface of a substrate selected from the group consisting of aluminum, paper, polyesters, polycarbonates, and acrylics.

* * * * *